July 9, 1935.  E. C. RANEY  2,007,342
REFRIGERATING APPARATUS
Filed Feb. 8, 1934  3 Sheets-Sheet 1
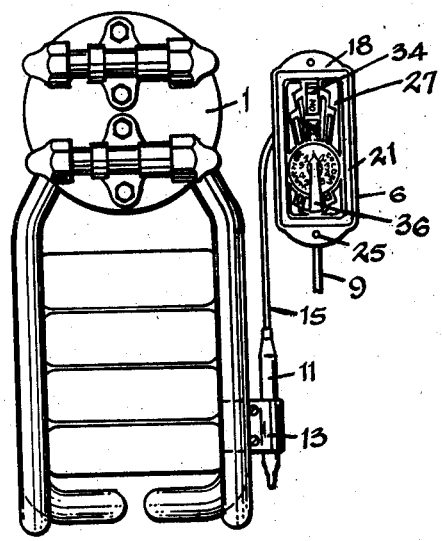
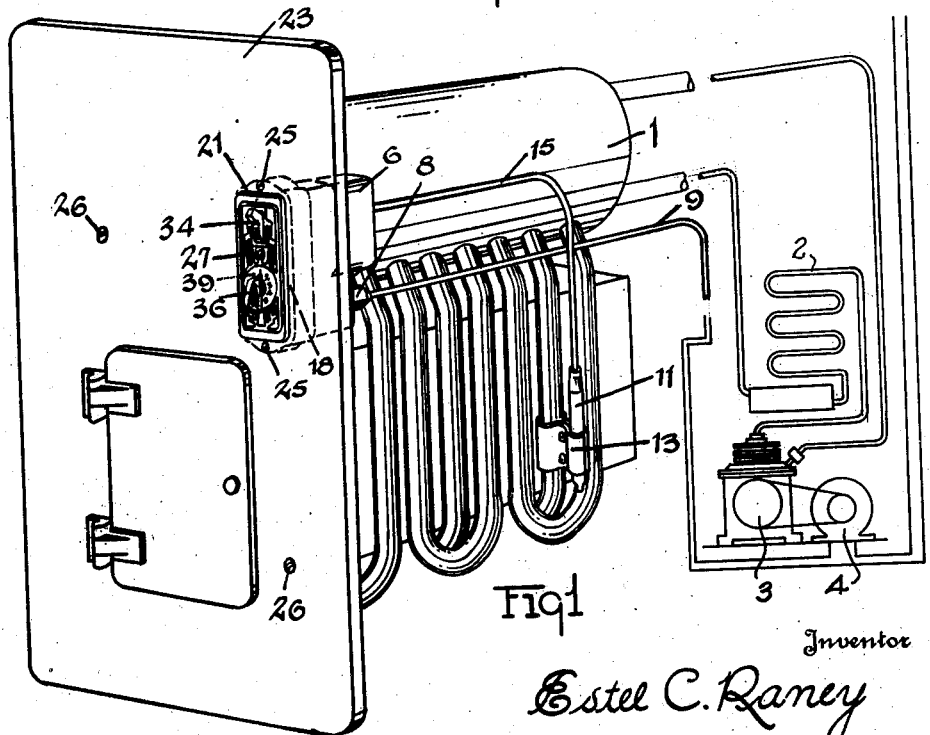
Inventor
Estel C. Raney

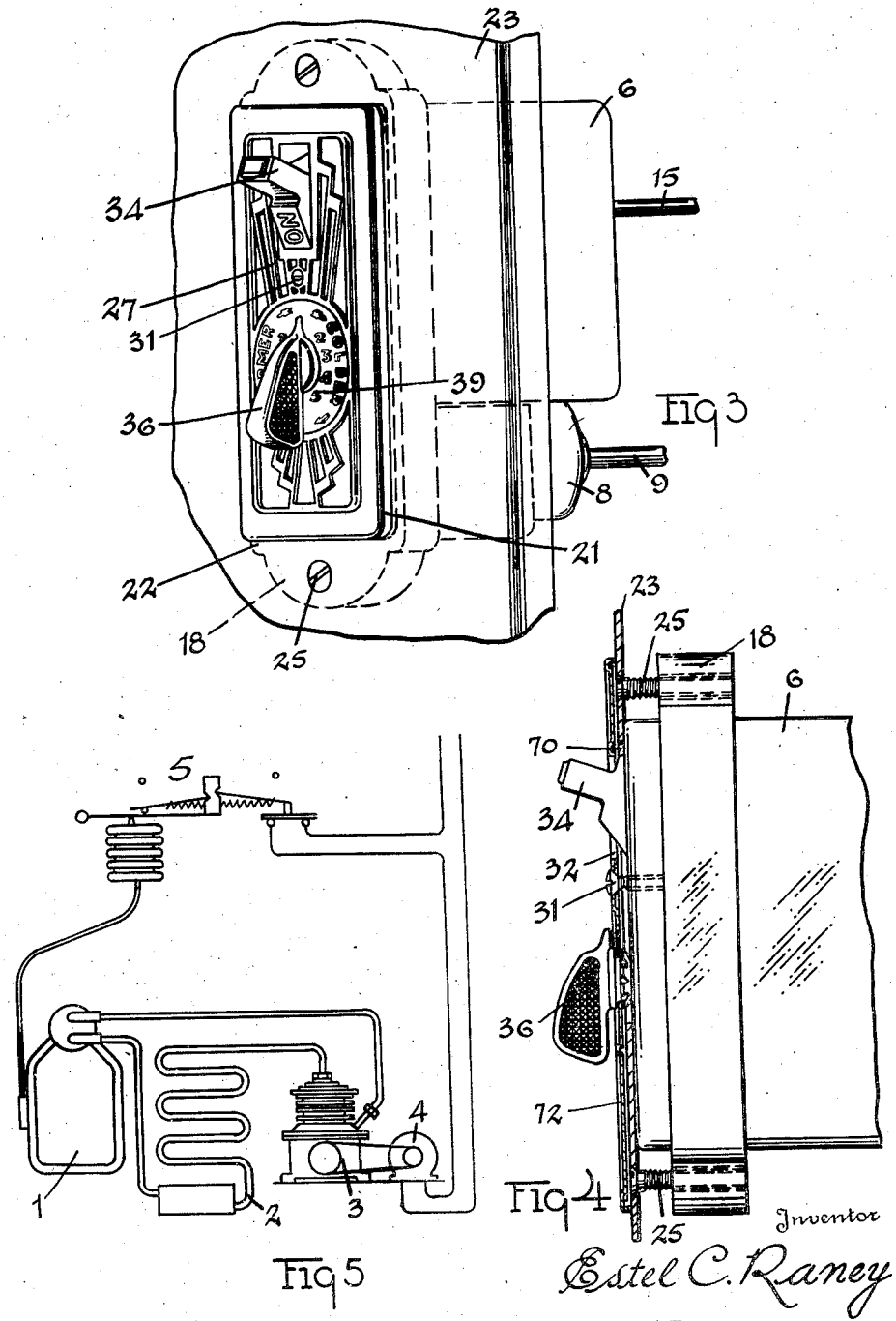

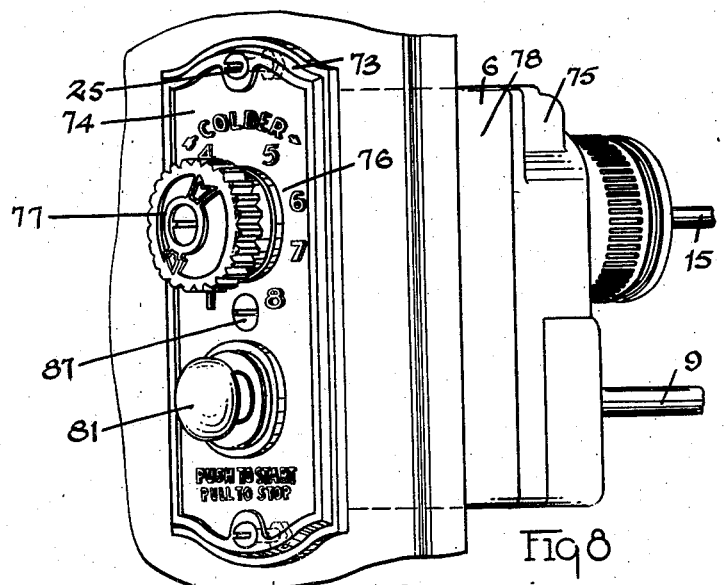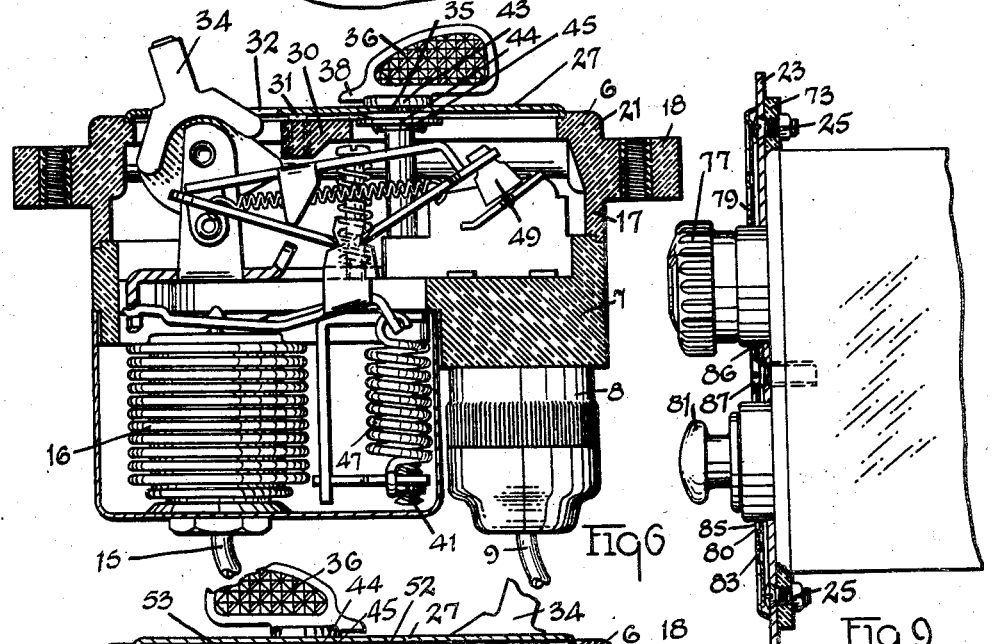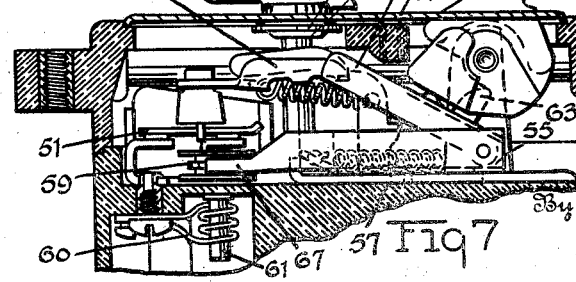

Patented July 9, 1935

2,007,342

UNITED STATES PATENT OFFICE 2,007,342

REFRIGERATING APPARATUS

Estel C. Raney, Columbus, Ohio

Application February 8, 1934, Serial No. 710,266

7 Claims. (Cl. 62—4)

My invention has for its object to provide a method of mounting a thermostatic control in a refrigerating apparatus.

The particular object of this invention is to provide a thermostatic control for electrically operated refrigerators having temperature regulating and switch operating means, that is adapted to be mounted on a face plate connected to the evaporator of the refrigerating apparatus so that the evaporator and thermostatic control may be handled as a single unit in the assembly of the refrigerator or in the servicing of the refrigerator in the field.

This invention also provides a convenient and attractive location of the thermostatic control in the refrigerator as the temperature regulating and switch controls of the thermostat extend through the face plate while the body of the thermostat is concealed by the face plate. An attractive name plate may be secured to the exposed face of the thermostat which greatly enhances the beauty of the refrigerator thereby increasing the saleability of the refrigerator.

The invention contains other features and advantages that will appear from the following description, and upon examination of the drawings. Structures and apparatus containing the invention may partake of different forms and may be varied in their details, and still embody the invention. To illustrate a practical application of the invention, I have selected a refrigerating apparatus to which may be connected one or the other of the two forms of control devices for controlling the temperature produced by the apparatus, it being understood that variations in the structure may be made without departing from the spirit of the invention. The particular structure selected is shown in the accompanying drawings.

Fig. 1 illustrates a perspective view of a refrigerating unit of a refrigerator. Fig. 2 is a front view of a refrigerating unit and illustrates a preferred form of control device and means for thermically connecting the control device to the refrigerating unit. Fig. 3 is an enlarged perspective view of the control device mounted in one position in the refrigerator. Fig. 4 illustrates a view of a section of the control device shown in Fig. 3 mounted in the refrigerator somewhat differently from the manner shown in Fig. 3. Fig. 5 is a diagrammatic view of a conventional electrically operated refrigerating apparatus. Fig. 6 illustrates a cross-section of the control device shown in Figs. 3 and 4 and illustrates the switch mechanism for opening and closing the circuit in response to temperature conditions in the refrigerator. Fig. 7 is a cross-section of the control device and illustrates the overload switch mechanism for automatically opening the circuit when an excess current flows through the circuit of the motor. Fig. 8 is an enlarged perspective view of a modified form of control device. Fig. 9 illustrates a view of a section of the control device shown in Fig. 8, mounted somewhat differently from the manner shown in Fig. 8.

The invention described and claimed herein is a division in part of my co-pending application Serial No. 608,319 filed April 29, 1932.

The control device is provided with a bellows that communicates through a suitable tube to a part of the refrigerating apparatus whose temperature or pressure is determinative of the temperature that is to be maintained in the refrigerating chamber of the refrigerator. Thus, the bellows may be connected with the low pressure side of the refrigerating apparatus to produce a pressure within the bellows that varies in accordance with the temperature of the chilling unit. Or the bellows and a tube having, if desired, a suitable bulb, may contain an expansible fluid, the bulb being connected to the expansion coil of the refrigerating apparatus, to produce expansion of the fluid according to the temperature of the chilling unit of the apparatus.

As shown in the drawings, the control device is adapted to be used in a refrigerating apparatus having an evaporator 1, a condenser 2, and a compressor 3, operated by a suitable motor 4. The control device 5 is preferably contained in a segmental shell 6, formed of hardened plastic, electric insulating material. The part 7 of the shell 6 receives an electrical connection 8, connected to the motor 4 by a suitable flexible insulating cable 9.

The control device may be thermically connected to the expansion unit by means of a bulb 11 which is connected to a bellows 16 in the control mechanism by a suitable flexible tube 15. The bulb may be connected to the expansion unit by a suitable connection, such as a clamp 13.

The part 17 of the shell 6 has a flanged part 18 at one end which forms a shoulder 21 extending completely around an end of the shell. In order to mount the control device, the end part is inserted through a suitable opening 22 of the face plate 23 of the evaporator and so as to be engaged by the shoulder 21. The shell is secured to the face plate 23 by means of screws 25, which operate to draw the flanged part 18 against and in pressing engagement with the rear side of the face plate 23.

To install the control device, the face plate may be removed from the evaporator by removal of suitable connecting screws 26, and one end of the control device may be easily inserted and secured in the opening 22 in the face plate, and, if desired, the thermic and electrical connections may then be made. The face plate may then be secured in position on the end of the evaporator, the flexible connectors, that is, the tube 15 and the cable 9, enabling manipulation of the face plate in the installation. To service the control device, the more commonly required adjustments may be made through the end of the shell and if examination of the entire construction is required, it may be readily disconnected from the apparatus and reassembled as described.

A suitable cover plate 27 is secured to the front part of the shell. It is connected to the bridge 30 of the shell by a suitable screw 31. The cover plate 27 has an opening 32 adapted to receive the rotatable element 34, which provides means for manually controlling the operation of the motor. A handle member 36 is rotatively secured to the cover plate 27. It has a hub that extends through an opening 35 formed in the plate and when the cover plate is placed in position, the handle member is readily adjustably connected to means for varying the temperature limits at which the controlling device will open or close the circuit of the motor. The handle member 36 has a suitable pointer 38 which indicates temperature adjustments on a suitable dial 39 formed on the cover plate 27.

The switch mechanism of the control device illustrated in Figs. 1-7 is disclosed in my copending application Serial No. 674,918, and contains a bellows 16 which responds to the change of pressure communicated to it through the tube or pipe 15 thermically connected to the expansion unit. The handle member 36 is connected to adjusting elements in the switch mechanism, such as the screw 41 that is rotatably supported on the base part of the shell and operates to adjust the spring 47 that presses against the bellows to resist its expansion movements. The handle member 36 has a hub 43, having a serrated recess, and the screw 41 is provided with a fluted end that fits the serrated recess of the hub 43 of the handle member. The handle member 36 is secured to the cover plate 27 by a disc 44 and a spring washer 45. The bellows and the spring cooperate to actuate a switch 49 to open and close the circuit in response to the temperature conditions of the refrigerator as determined by adjustment of the screw 41. The user's adjustment of the temperature by the adjustment of the handle 36 is limited within the range of the dial on the cover plate by suitable stops, while the screw 41 has unlimited adjustment when the cover plate is removed.

The adjustable temperature range as defined by the limitation of movement of the handle member 36 may be raised or lowered by removal of the handle member from the screw by removal of the cover plate and adjustment of the screw 41 and reconnection of the handle member to the screw 41. If it is desired to lower the temperature range of the refrigerating apparatus, the pointer 38 may be moved to the limit of its clockwise rotation. The cover plate 27 may then be removed, which disconnects the handle member from the adjusting screw 41. The pointer 38 may then be turned counter-clockwise and the plate 27 reconnected to the shell and the handle and pointer to the screw. In this way, the temperature range may be lowered as much as ten degrees, according to the change made in the dial pointer while removed from the adjusting screw. The temperature range of the refrigerating apparatus may be raised in a similar manner, the dial pointer, however, being turned clockwise after the plate and handle member have been removed from the shell. Thus it will be seen that expert adjustment of the temperature range of the refrigerating apparatus may be readily made by the removal of the cover plate and handle member only, and without disconnecting or dismantling the control device from the evaporator.

The switch mechanism is provided with means for manually opening and closing the circuit of the motor and for automatically opening the circuit when an excess current flows through the circuit of the motor. The contact 51 is supported on a switch arm formed of parts 52 and 53 and pivotally connected to the frame 55. The frame 55 is biased by a spring 57 for longitudinal movement and is normally retained in position against the tension of the spring 57 by means of the thermically controlled ratchet wheel 59 that may be released by an overload current flowing through the overload coil 60. In the control device shown in the drawings, the overload heater coil is readily accessible for replacement. When an overload current flows in the motor circuit, the heat produced in the overload coil heats the pin 61 to melt solder that fixedly secures the ratchet wheel 59 against rotation when an overload condition does not exist. When an overload current flows in the motor circuit, the heat produced in the coil 60 releases the ratchet, and the spring 57 shifts the frame 55 and operates the switch arm. In the form of construction shown, a finger 63 is connected to the part 52 and rotates the element 34, which depresses the part 52 and opens the switch when the frame is shifted. Restoration of the switch to control the current of the motor circuit may be made by rotation of the element 34 when the ratchet wheel connection has become cooled, to secure the ratchet fixedly. The element 34 engages the finger 63 and shifts the frame 55 to a point to enable a finger 67 to engage the ratchet 59 while it holds the switch open. When the element 34 is released, the part 52 rises and enables the switch to close. It will be evident from the construction shown in the drawings that the overload switch is readily accessible for expert adjustment and replacement of the parts upon mere removal of the face plate.

In the form of construction shown in Fig. 4, the control device mechanism is mounted in a manner somewhat different from that shown in Figs. 1 and 3. The face plate 23 is provided with a suitable opening 70 and adapted to receive the rotatable element 34 and the handle member 36. The control device is secured to the face plate by means of screws 25 which operate to draw the flanged part 18 towards the rear side of the face plate and press the end of the shell against the face plate. A suitable cover plate 72 of sufficient dimension to cover the screws 25 is supported on the face plate and secured to the bridge 30 of the shell by a suitable screw 31.

In assembling the control device, it may be electrically connected to the motor that drives the compressor and thermically connected to the evaporator and the shell containing the switch and bellows may be secured to the face plate.

To mount the control device, the face plate may be removed by removal of the connecting screws 26, and the rotatable element 34 and the handle member 36 may be easily inserted in the opening 70 and the control device may be readily secured to the back of the face plate by the screws 25. The flexible tube 15 and the cable 9 enable manipulation of the face plate during the installation of the control device. The face plate may then be secured in position on the evaporator and the cover plate 72 may be secured in position. To service the control device, the more commonly required expert adjustment may be made through the end of the shell upon removal of the cover plate, and if examination of the entire construction is required, it may be readily disconnected from the evaporator and reassembled as described.

In the form of construction shown in Fig. 8, the switch mechanism is of the type disclosed in my co-pending application Serial No. 608,319 and is electrically and thermically connected as described above. The shell 6 has a flanged part 73 extending around the front end of the shell and forming a panel portion 74 having a suitable dial 76 which will indicate the temperature adjustments resulting from manipulation of the handle member 77.

The face plate may be readily disconnected from the evaporator by removal of the screws 26 and the control device may be inserted in a suitable opening 22 in the face plate of the evaporator. The control device has a flanged part 73 that may be clamped or secured against the front side of the face plate 23 by means of screws 25. The thermic and electrical connections may then be made, the flexible tube 15 and cable 9 being provided with suitable connectors that enable ready connection with their associated parts. The flexibility of the connecting tube and cable enable connection and disconnection of the face plate while the control device is secured thereto and while it is connected electrically and thermically to the apparatus. The control device may be readily removed from the face plate by removal of the screws 25, and the entire construction may be made available by removing the front part 76 of the shell from the base 75 by removal of the screw 87.

In the form of construction shown in Fig. 9, the control device is thermically and electrically connected to the refrigerating apparatus as disclosed above. Suitable openings 79 and 80 are formed in the face plate 23 and are adapted to receive the handle member 77 and a defrosting and overload reset button 81. A cover plate 83 having openings 85 and 86, adapted to receive the handle member and reset button and having a suitably marked dial is fastened to the face plate 23, and to the flanged part 73 of the shell 6 by suitable screws 25 which operate to secure the flanged part 73 and the end of the shell against the rear side of the face plate.

The face plate may be readily disconnected from the evaporator by removal of the connecting screws 26, and the handle member 77 and the defrosting and overload reset button 81 may be inserted through the openings 79 and 80 respectively in the face plate, and the cover plate 83 may be secured to the face plate 23 and to the shell 6 by screws 25. The thermic and electrical connections may then be made, the flexible tube 15 and the cable 9 enabling manipulation of the face plate in the installation. The face plate may then be secured to the evaporator. To service the control device, the face plate may be disconnected and the control device may be readily removed from the face plate by removing the screws 25 and the cover plate 83. If required, the entire construction is made available by removing the front part of the shell upon removal of the screw 87, as in the arrangement shown in Fig. 8.

I claim:

1. In a refrigerating system, a cooling unit, a panel removably connected to said cooling unit, an electrical motor driven compressor, a condenser, a shell, a face plate attached to one side of the shell, a thermally operated electric switch enclosed within said shell for controlling the operation of the compressor motor and including a member for controlling the operation of said switch, said control member extending through said shell and face plate, and means for mounting said shell on the panel and having said face plate exposed on the front of said panel.

2. In a refrigerator system, a cooling unit, an electric motor driven compressor, a condenser, a panel removably connected to the said cooling unit, the panel having an opening, a shell having an end part located in the said opening, a thermic control switch located in the shell for controlling the operation of the compressor motor in response to temperatures produced in the cooling unit, and means for clamping a part of the said end of the shell against the rear of the face plate.

3. In a refrigerator system, a refrigerator having a chilling unit and an electric motor driven compressor, a shell, a panel removably secured to the chilling unit and having an opening, means for securing the shell against the rear of the said panel, a switch located in the shell for controlling the circuit of the motor, a thermic expansion device located in the shell for operating the switch, a flexible cable for connecting the switch to the motor, and a flexible tube for connecting the expansion device to the chilling unit for operating the switch according to the changes in temperature of the chilling unit.

4. In a refrigerating system, a motor driven compressor, a condenser, and a cooling unit, a panel removably attached to said cooling unit, an opening in the said panel, a shell having a face part on one end of the shell, a thermic switch for controlling the operation of the compressor motor in response to temperatures produced in the cooling unit and contained within the shell, means for removably securing the shell to the panel and in the opening to locate the face part of the shell in front of the said panel and the body of the shell at the rear of the panel.

5. In a refrigerating system, a cooling unit and electric motor driven compressor, a condenser and a cooling unit, a panel removably connected to the said cooling unit, an opening in the said panel, a shell, a thermo-responsive switch located in the shell for controlling the compressor motor in response to the temperatures produced in the cooling unit, said switch having a control member extending from the shell, and means for securing one end of the shell to the rear of the face plate and the control member extending through the said opening in the panel and accessible for manual manipulation from the front of the panel.

6. In a refrigerating system including an electric motor driven compressor, a condenser, a cooling unit, a panel removably attached to the cooling unit, a shell, an opening in one end of the shell, means for removably attaching the shell to the rear of the panel to locate the opening in the shell in registering relation with the opening in the panel, a switch located in the shell for controlling the operation of the compressor motor in response to the temperatures produced in the cooling unit, a rotatable member for adjusting the switch, a face plate, a dial pointer member rotatably supported on the face plate, the dial pointer having means for adjustably engaging the said rotatable member, and means for securing the said face plate over the opening in the said shell and rotatably connecting the dial pointer to the said rotatable member.

7. In a refrigerating system, a motor driven compressor, a condenser and a cooling unit, a panel removably attached to the cooling unit, the panel having an opening, a shell, a thermic switch for controlling the operation of the motor in response to temperatures produced in the cooling unit and contained within the shell and having parts for manual control of the thermic-switch, means for removably securing a surface of the shell against a surface of the panel to locate the body of the shell at the rear of the panel and the shell in registering relation to the opening of the panel and the manual control parts in front of the panel to enable manual operation of the said parts.

ESTEL C. RANEY.